United States Patent
Mastronardi et al.

(10) Patent No.: US 8,971,487 B2
(45) Date of Patent: Mar. 3, 2015

(54) STOWABLE ARCUATE DETECTOR ARRAY

(75) Inventors: Richard Mastronardi, Medfield, MA (US); David Blake, Georgetown, MA (US); Seth Van Liew, Waltham, MA (US); Jeffrey Warren, Westford, MA (US)

(73) Assignee: American Science and Engineering, Inc., Billerica, MA (US)

( * ) Notice: Subject to any disclaimer, the term of this patent is extended or adjusted under 35 U.S.C. 154(b) by 434 days.

(21) Appl. No.: 13/548,431

(22) Filed: Jul. 13, 2012

(65) Prior Publication Data

US 2013/0028376 A1    Jan. 31, 2013

Related U.S. Application Data

(60) Provisional application No. 61/511,781, filed on Jul. 26, 2011.

(51) Int. Cl.
*G01V 5/00* (2006.01)

(52) U.S. Cl.
CPC .................................. *G01V 5/0008* (2013.01)
USPC ........................................................ 378/57

(58) Field of Classification Search
USPC ..................................... 378/57, 55
See application file for complete search history.

(56) References Cited

U.S. PATENT DOCUMENTS

| | | | |
|---|---|---|---|
| 3,493,096 A * | 2/1970 | Antoszewski et al. | 198/395 |
| 5,014,293 A | 5/1991 | Boyd et al. | 378/197 |
| 5,692,028 A | 11/1997 | Geus et al. | 378/57 |
| 5,764,683 A | 6/1998 | Swift et al. | 378/57 |
| 6,094,472 A | 7/2000 | Smith | 378/86 |
| 7,319,738 B2 | 1/2008 | Lasiuk et al. | 378/59 |
| 7,322,745 B2 | 1/2008 | Agrawal et al. | 378/198 |
| 7,460,639 B2 | 12/2008 | Tudor et al. | 378/57 |
| 7,497,618 B2 | 3/2009 | Chen et al. | 378/198 |
| 7,517,149 B2 | 4/2009 | Agrawal et al. | 378/198 |
| 7,660,386 B2 | 2/2010 | Meng et al. | 378/57 |
| 7,817,776 B2 | 10/2010 | Agrawal et al. | 378/57 |
| 2004/0141584 A1 | 7/2004 | Bernardi et al. | 378/57 |
| 2011/0064192 A1 | 3/2011 | Morton et al. | 378/57 |

OTHER PUBLICATIONS

Insea, "Roboscan 1M," http://www.inseasa.gr/page/show/9/en, 10 pages (2009).
Korean Intellectual Property Office, Officer Young Lan Cha, International Search Report and Written Opinion, PCT/US2012/046691, date of mailing Jan. 23, 2013, 9 pages.

* cited by examiner

*Primary Examiner* — Kiet T Nguyen
(74) *Attorney, Agent, or Firm* — Sunstein Kann Murphy & Timbers LLP

(57) ABSTRACT

A mobile scanning system and methods for inspecting contents of a container. Multiple detector plates are arrayed along an arcuate member coupled to a conveyance with wheels, capable of road travel. A source generates high-energy penetrating radiation that irradiates each of the detector plates from a single position. The arcuate member is disposed, during the course of operation of the system, in a vertical plane. The system has one actuator for rotating the arcuate member about a horizontal pivot into a horizontal plane, and a second actuator for further rotating the arcuate member, once rotated into the horizontal plane, about a vertical pivot, so that the arcuate member is contained, for purposes of transport, entirely within a volume defined by a rectangular prism that does not extend horizontally outward from the conveyance beyond any of its wheels.

6 Claims, 9 Drawing Sheets

STOWABLE ARCUATE DETECTOR ARRAY

The present application claims the priority of U.S. Provisional Patent Application Ser. No. 61/511,781, filed Jul. 26, 2011, and incorporated herein by reference.

TECHNICAL FIELD

The present invention relates to systems and methods for inspection of cargo using high-energy penetrating radiation, and more particularly to systems borne on mobile platforms.

BACKGROUND ART

X-ray security inspection systems for cargo and shipping containers typically use transmission radiographic techniques. High inspection throughput of cargo and cargo-carrying vehicles is at a premium. Consequently, it is desirable that an entire plane through the cargo be probed simultaneously, and one inspection modality employs a fan-shaped beam to produce images of a target object while the fan beam and detectors are moved relative to the object. Alternatively, the object may be moved in a direction substantially perpendicular to the plane of the fan beam. In cases where illumination is provided by a fan beam of x-ray radiation, useful spatial resolution of contents of the inspected object is typically provided by a plurality of detector elements. The spatial pixel resolution is governed by the dimensions of the detector elements in a plane normal to the propagation direction of the beam, or else by post-collimators limiting the field of view of each detector element.

In cargo imaging applications, it may be necessary for the penetrating radiation to penetrate a significant thickness of highly attenuating material, and a requirement for penetration of more than 300 mm of steel equivalent is not unusual. As used herein, a penetration depth quoted in length of steel equivalent refers to the maximum steel thickness behind which a lead block can still be seen. For thicknesses of steel exceeding the penetration capacity of a particular imaging system, the image will be completely dark, and the block will not be seen.

To ensure the required penetration, inspection systems employed for the inspection of cargo, and in certain industrial applications, typically use x-rays with a maximum energy of several MeV, and, more particularly, in current systems, energies up to about 9 MeV. As used herein and in any appended claims, penetrating radiation of energies of at least 1 MeV may be referred to as hard x-rays or high energy x-rays.

Among non-intrusive inspection methods, x-ray imaging in its many forms is a proven technology capable of detecting a variety of contraband. X-ray systems have been based on transmission imaging in any of a variety of implementations: cone-beam, fanbeam, flying-spot, multi-projection configurations; dual-energy imaging; computed tomography; as well as on imaging incorporating the detection of x-ray radiation scattered in various directions.

Imaging performance is optimized when the incident beam of penetrating radiation, after traversing an inspected object, impinges upon each element of a detector array at as nearly a normal angle as possible to the active detector area of each detector element. In this manner, scatter from one detector element into another and from surrounding structure is minimized, moreover, the spatial resolution obtained by each element is optimized. When each of the elements is disposed at an equal distance from the illuminating source and with an active detector area transverse to the beam, spatial resolution is optimally matched across the field of view of the detector area. This configuration dictates an arcuate arrangement of the detector elements.

In August 2007, the US Congress passed a law, entitled the "Implementing Recommendations of the 9/11 Commission Act of 2007" (Pub. L. 110-53), requiring the screening of all cargo bound for the US prior to loading onto a ship. Standard ocean containers have an outside width of 8' and height of 8' 6". In order to interrogate the contents of the container non-invasively, an irradiating beam of penetrating radiation must traverse each cross section of those dimensions and impinge upon a detector array, dictating a detector array of substantial dimensions.

The use of an x-ray source and an x-ray detector, both located in a portal, for purposes of screening personnel, is the subject, for example, of U.S. Pat. No. 6,094,072, to Smith, issued Jul. 25, 2000, and incorporated herein by reference. A portal, however, is not typically amenable to rapid and flexible deployment, but, rather, requires a dedicated installation. A rapidly relocatable inspection system providing these features is desirable. An L-shaped detector, moreover, as provided by a rectilinear portal, has non-uniform response because detector solid angles in the beam are changing over the angle of the fan beam of penetrating radiation emitted by the source.

The economic impact of the 100%-screening requirement has been analyzed in the literature, typically subject to an assumption that the screening installation cannot be moved.

One configuration particularly well-suited to cargo inspection is provided by subject matter described in US Published Patent Application 2012/00932288, filed Sep. 19, 2011, entitled "Remotely-Aligned Arcuate Detector Array of High Energy X-Ray Imaging," and incorporated herein by reference.

While the advantages of detectors disposed equidistantly from a source are known, it has been considered impossible to implement an arcuate detector array on a road-capable vehicle because the radius of curvature of such an array, and thus its distance from the source, exceeds the dimensional standards legally applicable to commercial vehicles, particularly those in the U.S. and Europe.

One solution has been to dispose a detector on one conveyance, and to dispose a source on a separate conveyance, as shown in U.S. Pat. No. 7,460,639 (to Tudor et al.). Such a stratagem is less desirable, however, than a solution that would allow both the source and a true arcuate detector array to be conveyed by means of a road-capable vehicle. Such a solution is provided in the present invention.

SUMMARY OF THE INVENTION

In accordance with embodiments of the present invention, a mobile scanning system is provided for inspecting contents of an inspected container. The mobile scanning system has a conveyance with wheels, capable of road travel. Additionally, the mobile scanning system has a plurality of detector plates disposed along an arcuate member coupled to the conveyance and disposed, during inspection operation, in a vertical plane, and a source of penetrating radiation of peak energy of at least 1 MeV disposed so as to irradiate each of the detector plates from a single position. The mobile scanning system also has a first actuator for rotating the arcuate member about a horizontal pivot into a horizontal plane and a second actuator for further rotating the arcuate member, once rotated into the horizontal plane, about a vertical pivot, such that the arcuate member is contained, for purposes of transport, entirely within a volume defined by a rectangular prism that does not extend horizontally outward from the conveyance beyond the plurality of wheels of the conveyance.

In certain embodiments of the invention, the arcuate member may be further characterized by a radius exceeding 5 meters relative to a center of curvature. The mobile scanning system may also have a propulsion mechanism for moving the source and the plurality of detector plates with respect to the inspected container.

In alternate embodiments of the invention, the source of penetrating radiation may include a linac. The scanning system may also have a break-away mechanism for decoupling the arcuate member from the conveyance.

In yet other embodiments of the invention, a method may be provided for stowing an arcuate array of detector elements for transport from a first inspection site to a second inspection site. The arcuate array of detector elements is disposed along an arcuate member coupled to a conveyance and, during inspection operation, lies in a vertical plane. The method has the processes of:
  a. rotating the arcuate member, with a first actuator, about a horizontal pivot into a horizontal plane; and
  b. further rotating the arcuate member, once rotated into the horizontal plane, about a vertical pivot, so as to be contained, for purposes of transport, entirely within a volume defined by a rectangular prism that does not extend horizontally outward from the conveyance beyond the plurality of wheels of the conveyance.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS OF THE INVENTION

Definitions

Figure 1:
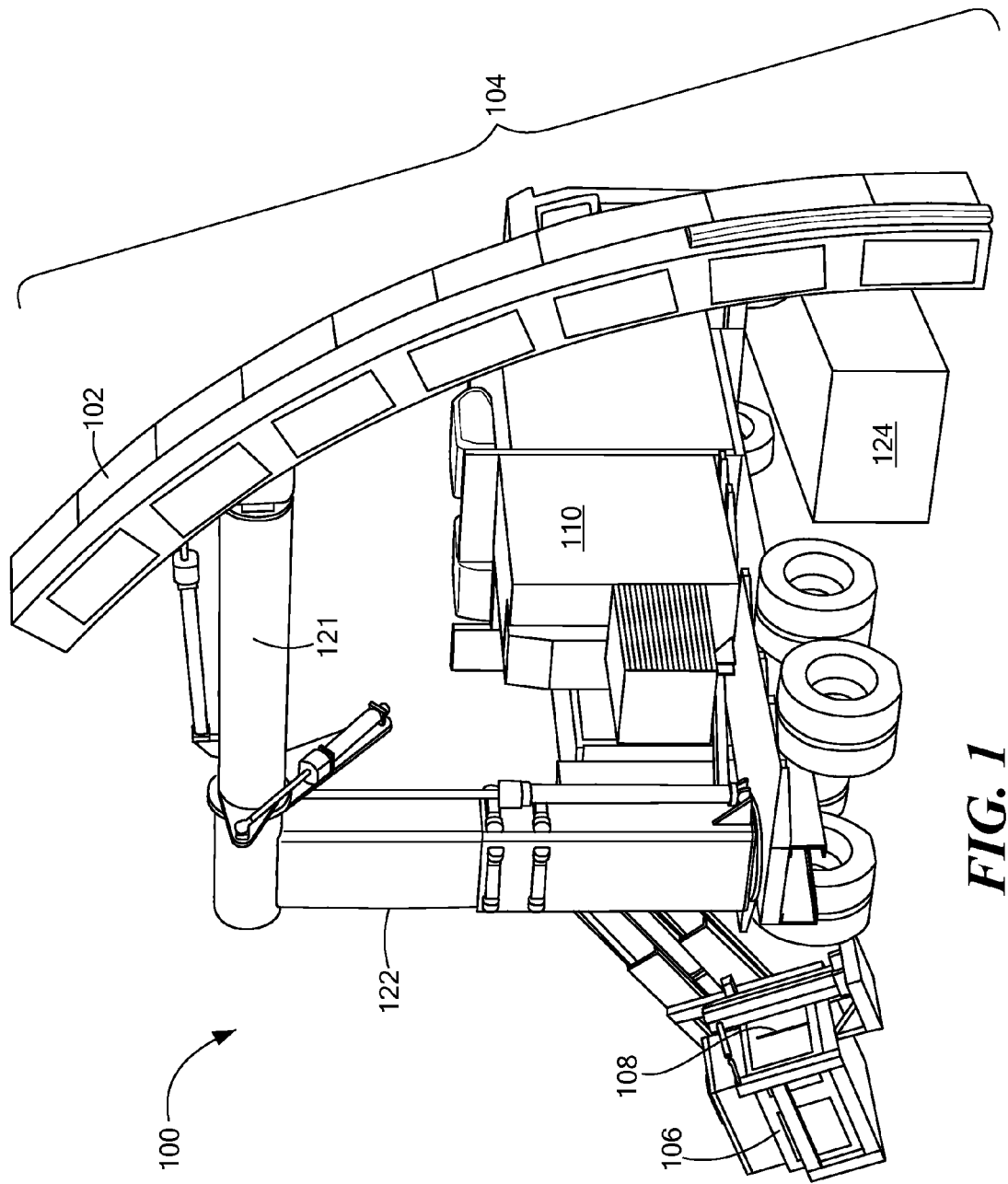
FIG. 1 shows a mobile inspection system with an arcuate detector array deployed for cargo inspection, in accordance with an embodiment of the present invention.
Figure 2:
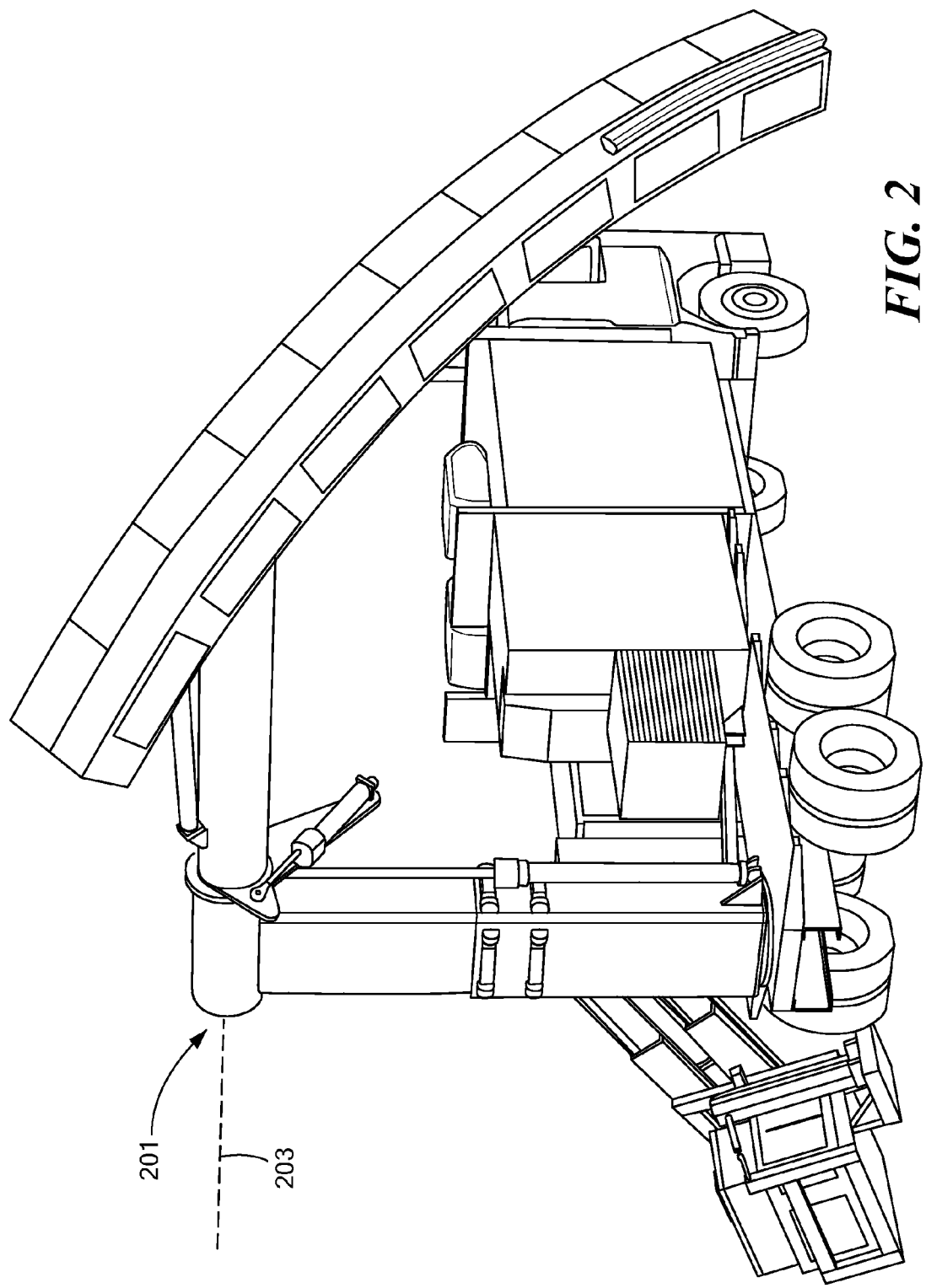
FIG. 2 shows a mobile inspection system with an arcuate detector array rotated with respect to a transverse boom, in accordance with an embodiment of the present invention.

As used herein, when the terms "high" and "low" are used in conjunction with one another; the terms are to be understood in relation to one another. Thus, "low energy", or "lower energy," refers to radiation which is characterized by a lower endpoint energy than radiation which is characterized as "high energy" or "higher energy." When used alone, the term "high energy" or "hard," describing radiation, refers to radiation characterized by an endpoint energy of at least 1 MeV per particle.

As used herein, the term "penetrating radiation" refers to electromagnetic radiation of sufficient energy per photon to penetrate materials of interest to a substantial and useful degree and include x-rays and more energetic forms of radiation. For convenience, the term "x-ray" may be used, without limitation, as an example of penetrating radiation as employed within the scope of the present invention.

As a matter of heuristic convenience, orientational designations may be referred to herein, and in any appended claims, with respect to local surface features. Thus, for example, "horizontal" denotes a plane parallel to the bed of a truck parked on the ground, whether the local surface of the ground is rigorously horizontal or, itself, on a slope.

A "mobile platform" may refer to a truck, trailer or any other conveyance than can easily be moved to a new location. As used in this description and in the appended claims, a "vehicle" includes any conveyance that may be driven, pushed, or pulled from one place to another, whether over the surface of land or otherwise. The terms "vehicle" and "mobile platform," as used herein, further include the structures, components and contents that are conveyed together with the respective conveyance.

As used in this description and in the appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as atomic number, in one or more colors constitutes an image. So, also, does an array of numbers in a computer memory or holographic medium. Similarly, "imaging" can refer to the rendering of a stated physical characteristic for visual inspection by a human.

As used herein and in any appended claims, the term "arcuate" will refer to a geometrical shape having at least a portion that may be represented as a portion of a circle having a finite radius of curvature. Thus, an arcuate structure, for example, may have portions characterized by distinct radii of curvature.

Embodiments of the invention described herein serve to characterize materials which may be contained within a cargo container and thus not readily susceptible to visual scrutiny. The characteristics of a material which might be the object of non-invasive inspection and which lend themselves to detection using the device and method taught by the invention include, but are not limited to, electron density, atomic number, mass density, linear dimensions and shape, as well as autonomous emission (such as due to fission or to radioactive decay). These characteristics are unveiled by taking advantage of the various physical processes by which penetrating radiation interacts with matter. Penetrating radiation refers to electromagnetic radiation of sufficient energy per photon to penetrate materials of interest to a substantial and useful degree and include x-rays and more energetic forms of radiation. The interaction of such radiation with matter can generally be categorized as either scattering or absorption processes. Both types of process remove x-ray photons from a collimated (i.e., directional) beam; scattering processes do so by deflecting photons into new directions (usually with loss of energy), while absorption processes simply remove photons from the beam.

Conventional transmission imaging measures the total beam attenuation as a function of position on the image plane. The total beam attenuation may be described by a parameter called the mass attenuation coefficient, as commonly employed by persons skilled in the art of x-ray inspection. Transmission x-ray images provide a map of the attenuation characteristics of the inspected object for the full spectrum of the x-ray beam. It should be noted that images may be directly displayed in graphic format for the visual inspection of human operators, but need not be so displayed.

A preferred embodiment of the present invention is now described with reference to FIGS. 1-9, where a rapidly relocatable x-ray inspection system, designated generally by numeral 100 is shown in a deployed configuration used for inspection of an inspected object, which may include a cargo container, a vehicle, or any item conveyed within the inspection capability of inspection system 100. Rapidly relocatable x-ray inspection system 100 may be referred to herein as "mobile," in that it may be conveyed on highways, and is generally suited for road travel, whether conveyed under its own power, or pulled by any manner of tractor.

Relocatable x-ray inspection system 100 is entirely integral with a conveyance, designated generally by numeral 110, exemplified in the embodiment depicted in FIGS. 1-9 as a truck. Conveyance 110 may be a truck, capable of self-propulsion on, or off, roads, or conveyance 110 may also be a trailer that may be hauled by a truck or other self-propelled tractor. Typically, x-ray inspection system 100 is operated in a "portal" mode, where the system is stationary and inspected container 124 (or a vehicle) moves past it. In other embodiments of the invention, x-ray inspection system 100 may move past an inspected object.

In relocatable x-ray inspection system 100, a plurality of detector modules 102 are arrayed in a curvilinear configuration, represented in FIG. 1 by arc 104. Arc 104, or one or more substantial portions thereof, forms a portion of a circle (or, of more than one circle), such that all detector elements (shown in US Published Application 2012/00932288) that comprise each of the modules 102 receive radiation directed from an x-ray source 106, but all of the detector elements are substantially immune to scatter radiation arising at other detectors or elsewhere within the system. More particularly, the arcuate geometrical configuration of detector ensures that the broad faces of each detector crystal are adjacent to another one, thereby significantly reduces scatter into distal crystals, which is much worse, for purposes of imaging, than scatter from adjacent crystals. Moreover, gaps between crystal elements are advantageously minimized in an arcuate geometry. Additionally, scatter shielding (such as vanes formed of tungsten, or other material) may be provided between adjacent detector elements, thereby collimating the detector elements to "see" only the x-ray focal spot. This is a key factor in reducing in-plane scatter.

For convenience of terminology, the detector elements arrayed in arc 104 may, collectively, be referred to herein as arcuate detector array 104. Detector elements of arcuate detector array 104 may be aligned as described in detail in US Published Application 2012/00932288.

Source 106 emits penetrating radiation, typically x-rays at a spectrum of energies up to 9 MeV, typically by acceleration of electrons in a linac incident upon a metallic target (not shown) and subsequent Bremsstrahlung emission from the target. The endpoint energy typically exceeds 3 MeV, and multiple endpoint energies may be employed within the scope of the present invention. X-rays emitted by source 106, typically in pulses on the order of microseconds, are collimated into a fan beam by x-ray beam forming mechanism 108, shown as a collimator, typically formed of lead with an exit slot characterized by a gap, preferably on the order of several mm in width.

In a preferred embodiment of the invention, a multi-component x-ray beam-forming mechanism optimizes parameters of beam flatness and x-ray beam dimension. The narrower the X-ray beam, the smaller the dose to cargo and amount of unwanted scattered x-rays.

In a preferred embodiment, detectors modules 102 cover a circular arc 104 having a circular extent typically on the order of 60°. Arc 104 is disposed at a radius R of approximately 8 m so as to allow mast 122, rigidly coupling source and detector modules 102, to be propelled over inspected cargo 124, which may include one or more vehicles, or one or more cargo containers, for example. The height of inspected cargo may extend, in the embodiment shown in FIG. 1, as high as 5 m. Detector signals derived from detector elements of each of the detector modules are combined to derive an imaging signal, combined by a processor to yield an image of the contents of the inspected cargo or else other desired characteristics of the contents, as known in the art.

Arcuate detector array 104 is maintained, during inspection operations, in alignment with the x-ray beam to a very high tolerance. In one embodiment of the invention, described by way of example and without limitation, the beam width at the detector is characterized by a substantially flat intensity profile over approximately 10 mm. High image quality is achieved as long as each detector (of nominal 6-mm width) lies within the flat portion of the beam intensity profile This requirement allows +/−2 mm for relative motion of the structure to the x-ray beam and initial alignment to the center of the beam. In this example, an error margin of ±1 mm is allocated for structural deflections and ±1 mm for initial alignment.

Support of arcuate detector array 104 relative to conveyance 110 is provided by boom 121 and mast 122. Components of relocatable x-ray inspection system 100 are depicted, in FIG. 1, substantially in the configuration employed during the course of inspection operations.

In accordance with some embodiments of the invention, a break-away feature may be provided, allowing for decoupling of arcuate detector array 104 from boom 121 in the event that the arc is hit by a vehicle subject to inspection, or in case the arc hits a relatively immoveable object. This break away feature minimizes damage to the detector array under these circumstances.

Upon suspension of inspection operations, and in order to stow arcuate detector array 104 for transport of relocatable x-ray inspection system 100 to a different location, stowing operations are initiated as now described with reference to FIGS. 2-9. Rotary actuator 201, fixed with respect to mast 122, rotates boom 121 about a horizontal axis 203 so as to rotate arcuate detector array 104 out of a vertical plane.

Figure 3:
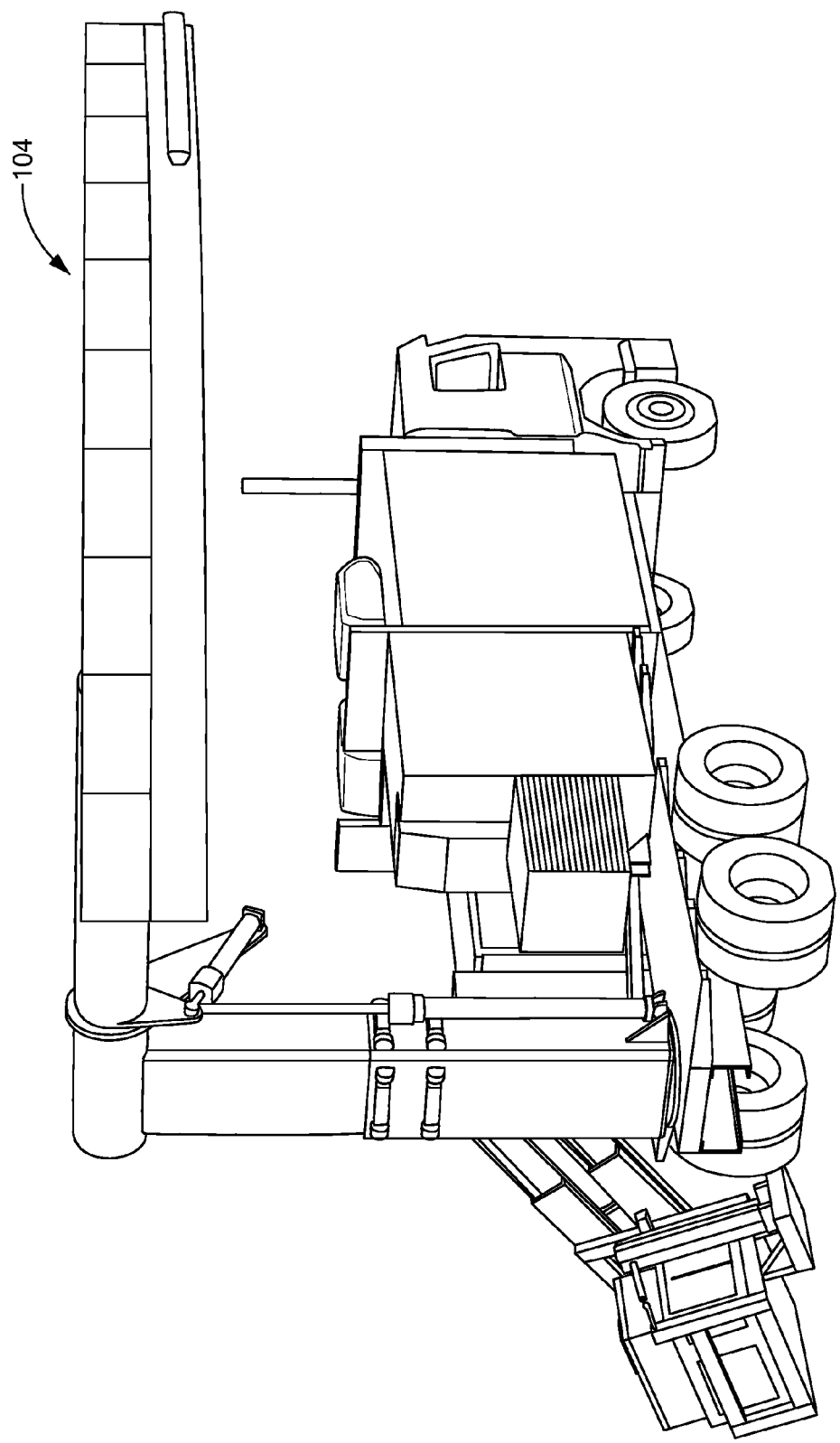
FIG. 3 shows a mobile inspection system with an arcuate detector array fully rotated into a horizontal plane, in accordance with an embodiment of the present invention.
Figure 4:
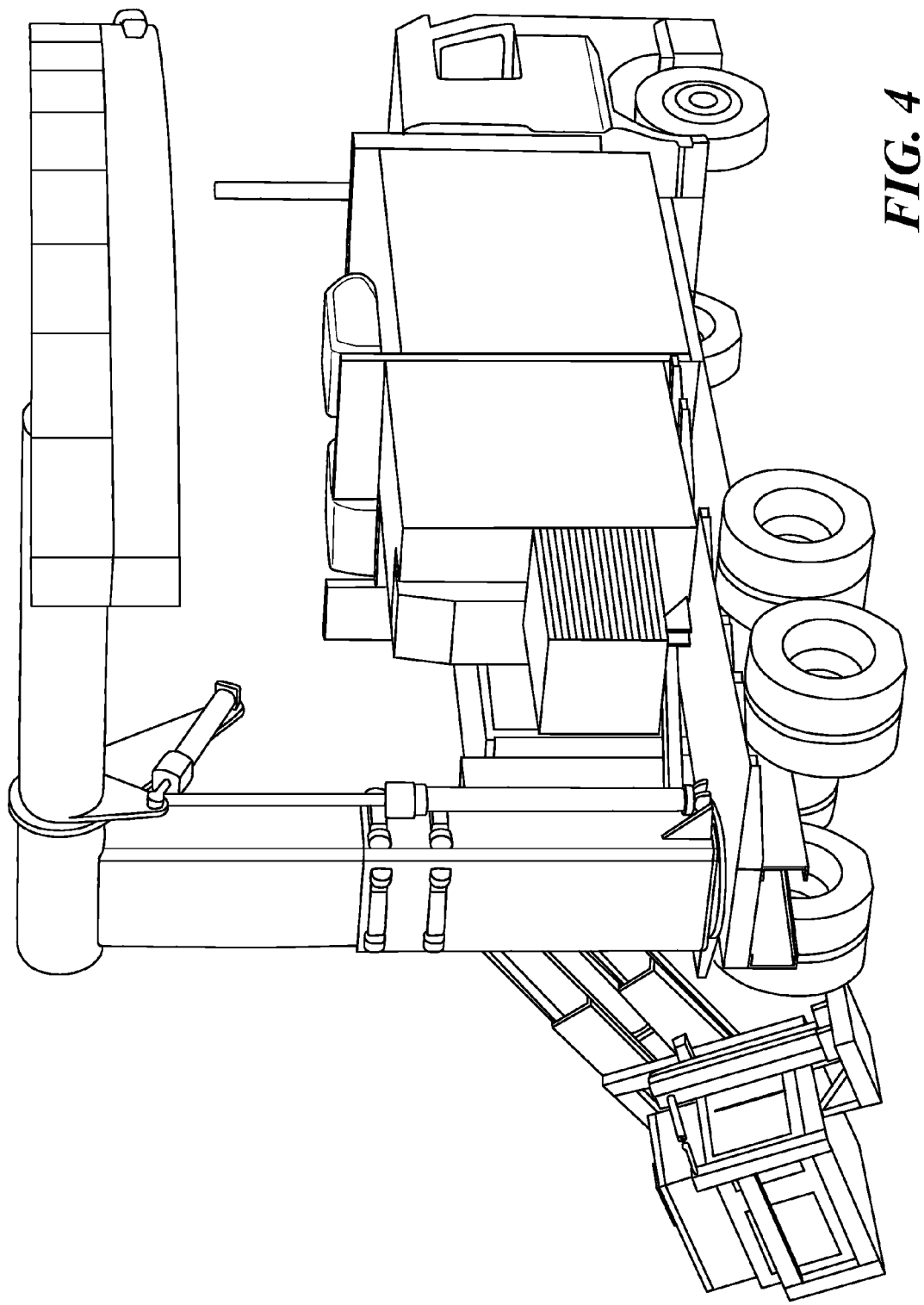
FIG. 4 shows a mobile inspection system with an arcuate detector array beginning to fold into alignment relative to the boom, in accordance with an embodiment of the present invention.
Figure 5:
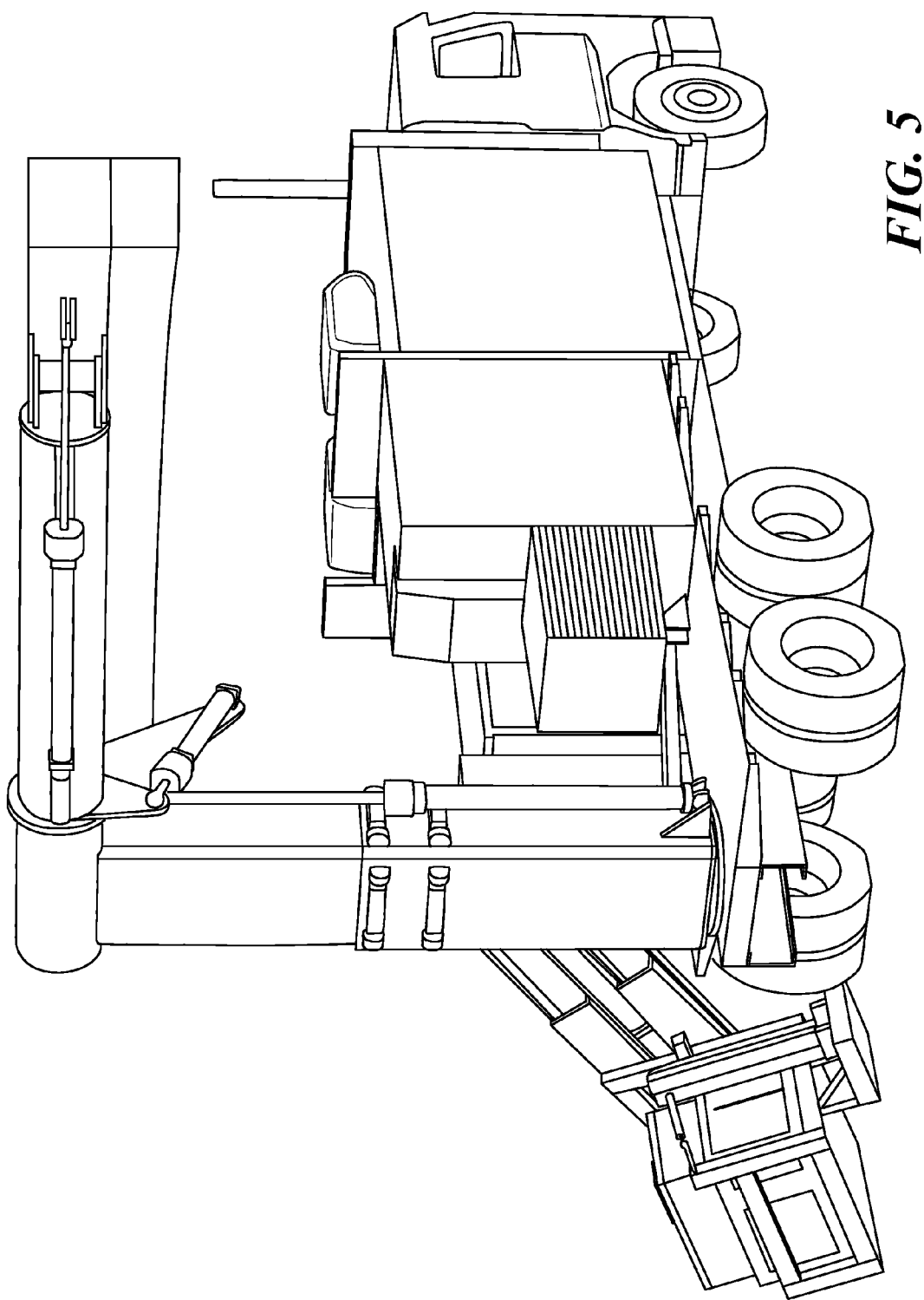
FIG. 5 shows a mobile inspection system with an arcuate detector array fully folded into alignment relative to the boom, in accordance with an embodiment of the present invention.

FIG. 3 depicts arcuate detector array 104 after rotation of boom 121 by 90° such that the array lies substantially in a horizontal plane. FIG. 4 shows a mobile inspection system with an arcuate detector array 104 beginning to fold, within a substantially horizontal plane, into alignment relative to boom 121, through actuation of a second actuator (not shown). Completion of the folding operation leaves arcuate detector array 104 fully folded into alignment relative to boom 121, as shown in FIG. 5.

Figure 6:
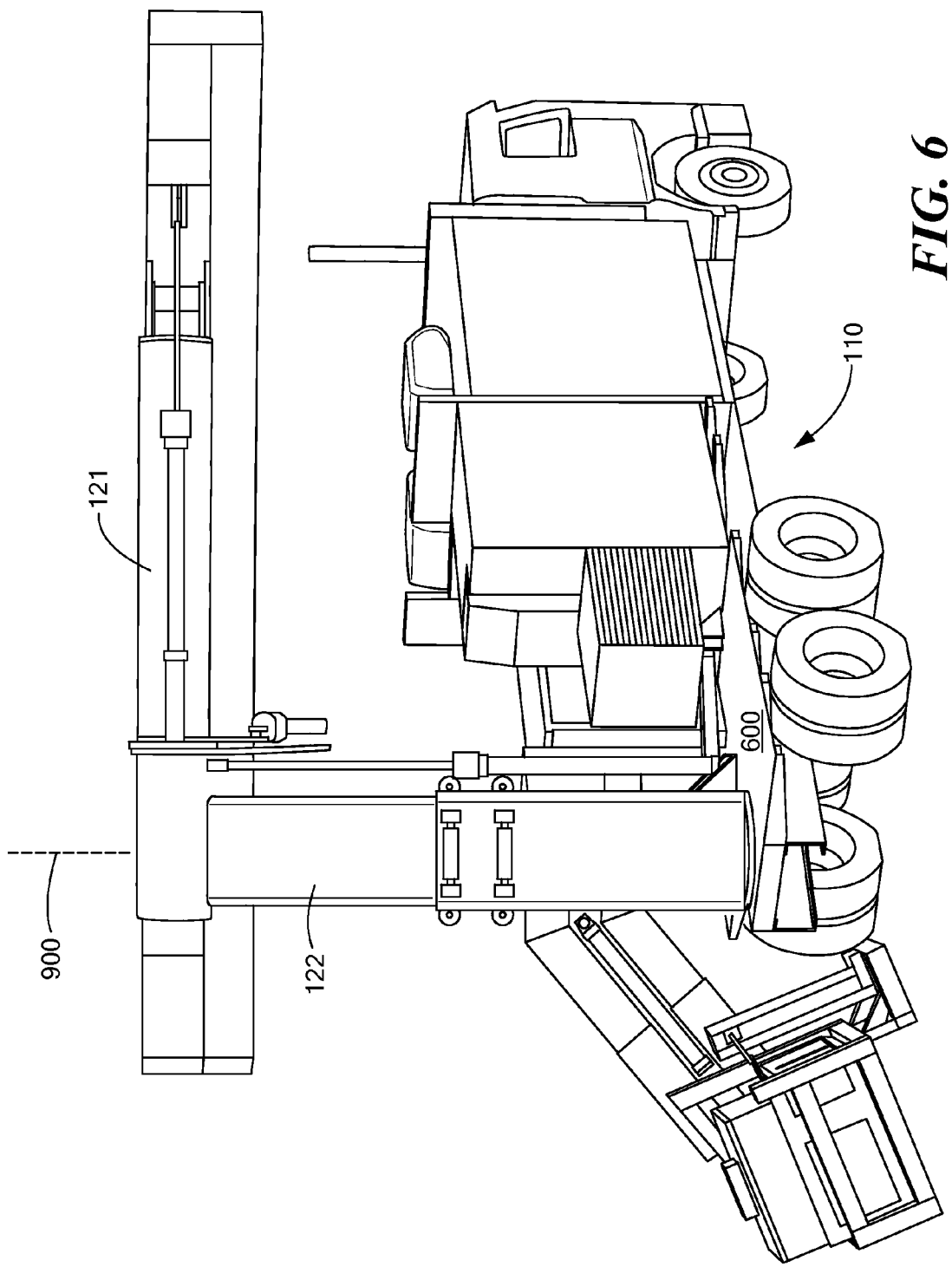
FIG. 6 shows a mobile inspection system with an arcuate detector array, with its mast beginning to rotate, in accordance with an embodiment of the present invention.
Figure 7:
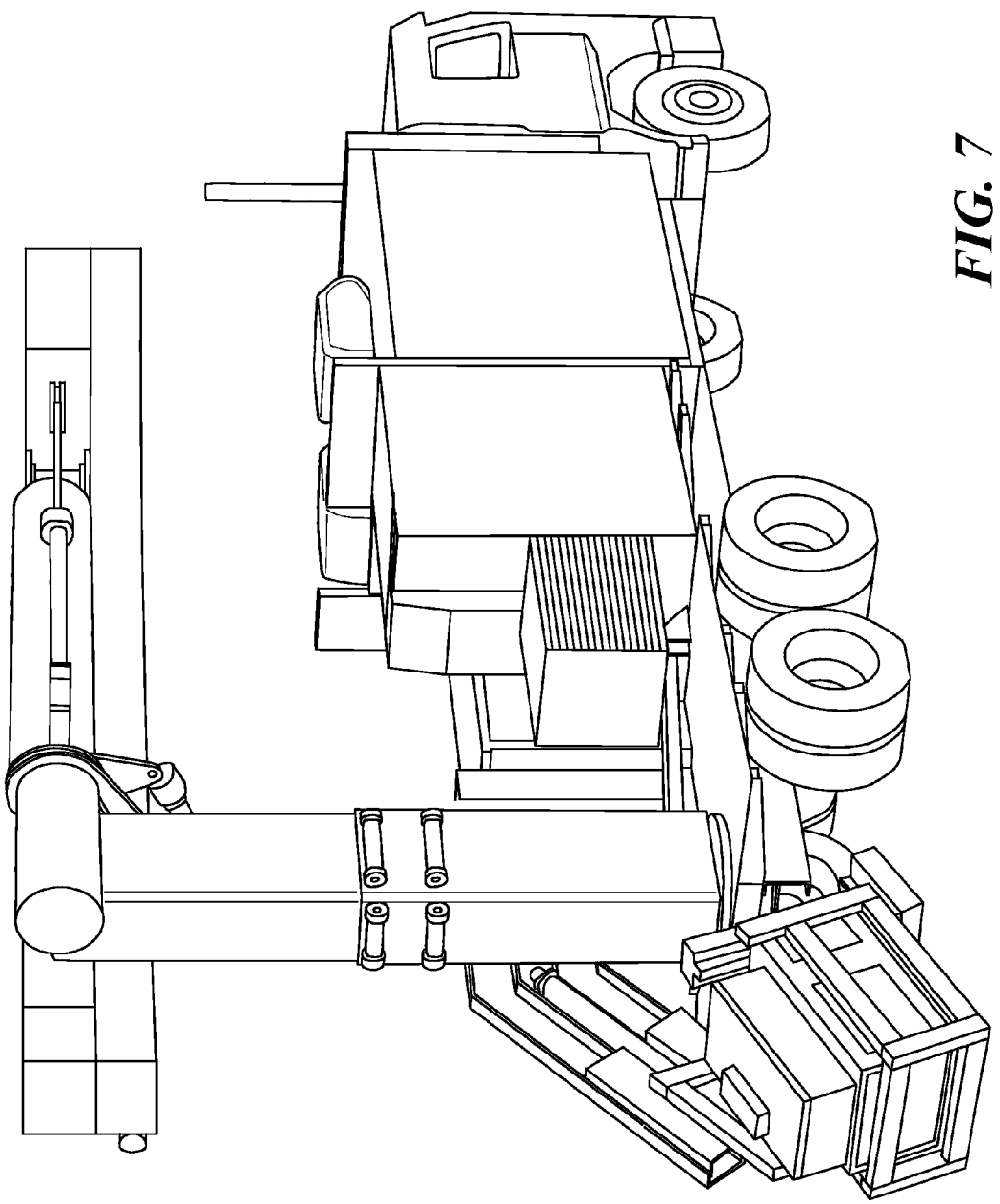
FIG. 7 shows a mobile inspection system with an arcuate detector array, with its mast rotated to position the boom in a forward direction, in accordance with an embodiment of the present invention.
Figure 8:
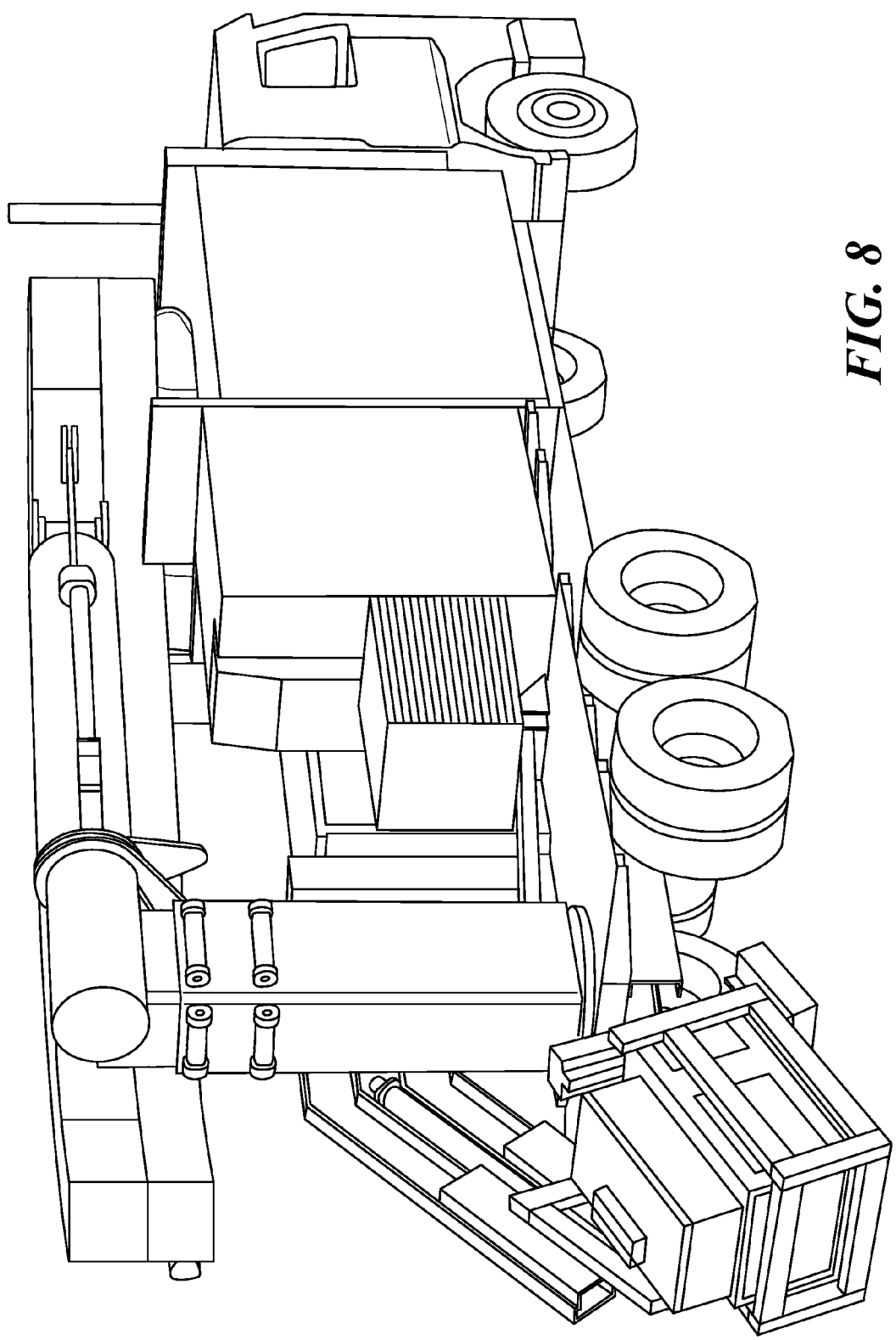
FIG. 8 shows a mobile inspection system with an arcuate detector array, with its mast fully retracted, in accordance with an embodiment of the present invention.

In FIG. 6, mast 122 is shown beginning to rotate about vertical axis 900 relative to bed 600 of conveyance 110, by virtue of the action of a third rotary actuator. In FIG. 7, mast 122 has been rotated to position boom 121 in a forward direction relative to conveyance 110. Mast 122 is then retracted by a fourth actuator, lowering arcuate detector array 104 for stowage aboard conveyance 110, within the profile constraints of a roadworthy vehicle.

Figure 9:
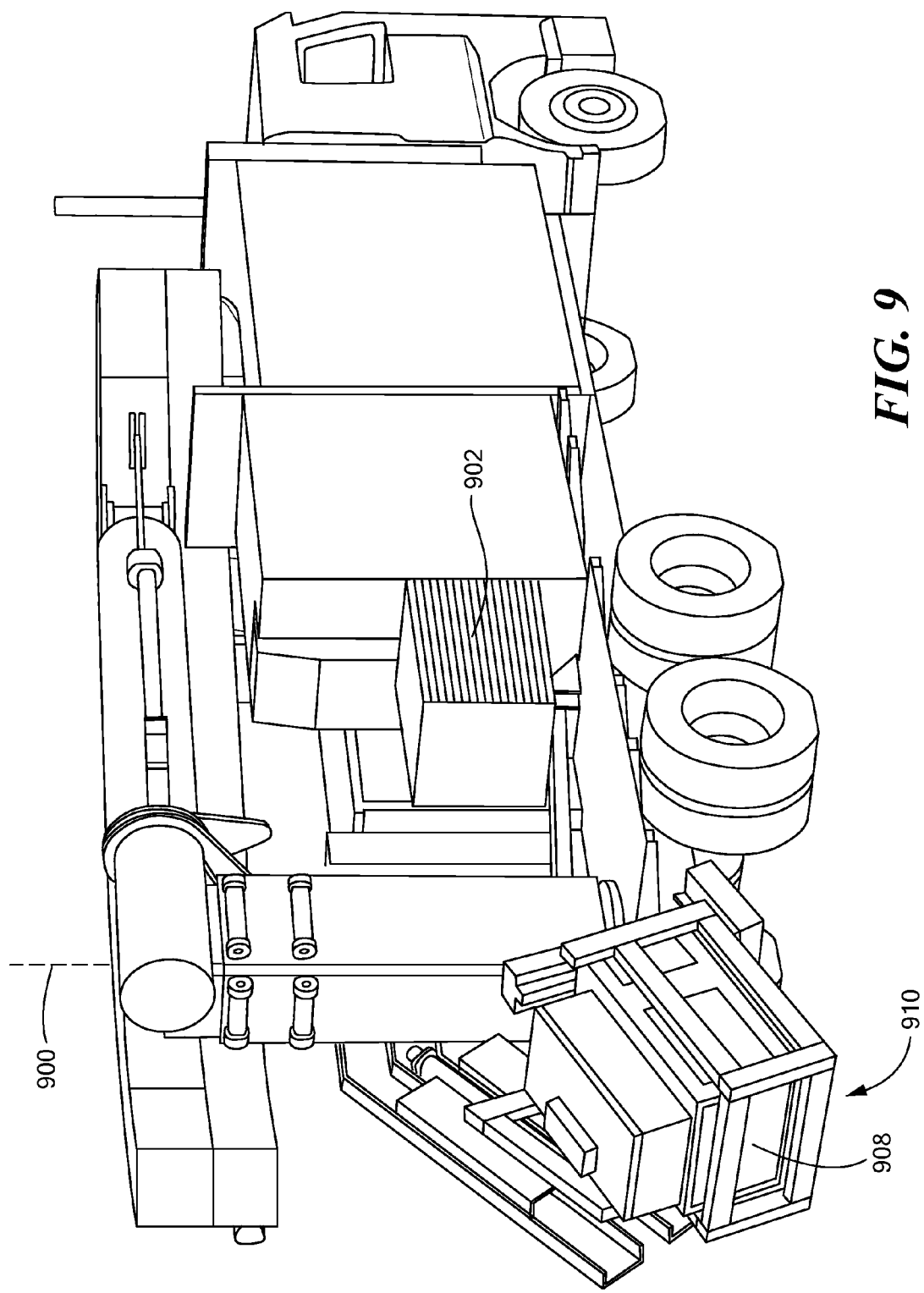
FIG. 9 shows a mobile inspection system with its linac x-ray source stowed, in accordance with an embodiment of the present invention.

Referring now to FIG. 9, source 106 (preferably a linac) is preferably disposed on a deployable member 910, which, in the embodiment depicted in FIGS. 1-9, is a platform 910 that may be extended outward from conveyance 110 by rotation with mast 122 about substantially vertical axis 900. Typically, mast 122 rotates by approximately 90° between its stowed position, for on-road travel, and its deployed position, for inspection operation. In particular, in its stowed condition, arcuate detector array 104 is contained entirely within a volume defined by a rectangular prism that does not extend horizontally outward from the conveyance beyond the plurality of wheels of the conveyance.

Conveyance 110 also carries a chiller 902 for cooling linac 106 as well as an electronics module including a controller, the electronics module and controller described in US Published Application 2012/00932288, incorporated herein by reference. Additionally, conveyance 110 typically includes an electrical generator, such as a gasoline- or diesel-powered genset, and a fuel tank.

Embodiments of the present invention advantageously provide an arc-shaped array of detectors that may be deployed from, and stowed on, a mobile platform meeting over-the-road height regulations in both the USA and Europe, and still maintaining a scan area of up to 5 meters high and sufficiently wide as to accommodate standard ocean cargo containers.

The described embodiments of the invention are intended to be merely exemplary and numerous variations and modifications will be apparent to those skilled in the art. All such variations and modifications are intended to be within the scope of the present invention as defined in the appended claims.

We claim:

1. A mobile scanning system for inspecting contents of an inspected container, the mobile scanning system comprising:
   a. a conveyance capable of road travel, the conveyance having a plurality of wheels;
   b. a plurality of detector plates disposed along an arcuate member coupled to the conveyance and disposed, during inspection operation, in a vertical plane;
   c. a source of penetrating radiation of peak energy of at least 1 MeV disposed so as to irradiate each of the detector plates from a single position;
   d. a first actuator for rotating the arcuate member about a horizontal pivot into a horizontal plane; and
   e. a second actuator for further rotating the arcuate member, once rotated into the horizontal plane, about a vertical pivot, such that the arcuate member is contained, for purposes of transport, entirely within a volume defined by a rectangular prism that does not extend horizontally outward from the conveyance beyond the plurality of wheels of the conveyance.

2. A mobile scanning system in accordance with claim 1, wherein the arcuate member is further characterized by a radius exceeding 5 meters relative to a center of curvature.

3. A mobile scanning system in accordance with claim 1, further comprising a propulsion mechanism for moving the source and the plurality of detector plates with respect to the inspected container.

4. A scanning system in accordance with claim 1, wherein the source of penetrating radiation includes a linac.

5. A scanning system in accordance with claim 1, further comprising a break-away mechanism for decoupling the arcuate member from the conveyance.

6. A method for stowing an arcuate array of detector elements for transport from a first inspection site to a second inspection site, the arcuate array of detector elements disposed along an arcuate member coupled to a conveyance and disposed, during inspection operation, in a vertical plane, the method comprising:
   c. rotating the arcuate member, with a first actuator, about a horizontal pivot into a horizontal plane; and
   d. further rotating the arcuate member, once rotated into the horizontal plane, about a vertical pivot, such that the arcuate member is contained, for purposes of transport, entirely within a volume defined by a rectangular prism that does not extend horizontally outward from the conveyance beyond the plurality of wheels of the conveyance.

* * * * *